United States Patent
Strasser

[11] 3,979,224
[45] Sept. 7, 1976

[54] FUEL CELL BATTERY CONSISTING OF A PLURALITY OF FUEL CELLS

[75] Inventor: Karl Strasser, Erlangen, Germany

[73] Assignee: Siemens Aktiengesellschaft, Munich, Germany

[22] Filed: Feb. 26, 1974

[21] Appl. No.: 446,082

Related U.S. Application Data

[63] Continuation of Ser. No. 261,245, June 9, 1972, abandoned.

[30] Foreign Application Priority Data

June 11, 1971 Germany.......................... 2129187

[52] U.S. Cl. .................................... 429/18; 429/36
[51] Int. Cl.² ........................................ H01M 8/02
[58] Field of Search ................................ 136/86 R

[56] References Cited
UNITED STATES PATENTS

| | | | |
|---|---|---|---|
| 2,928,783 | 3/1960 | Bacon | 136/86 R |
| 3,126,302 | 3/1964 | Drushella | 136/86 R |
| 3,248,267 | 4/1966 | Langer et al. | 136/86 R |
| 3,253,956 | 5/1966 | Vielslich et al. | 136/86 F |
| 3,328,204 | 6/1967 | Grubb | 136/86 E |
| 3,364,071 | 1/1968 | Kordesch | 136/86 R |
| 3,533,852 | 10/1970 | Baker et al. | 136/86 R |
| 3,730,774 | 5/1973 | McKee et al. | 136/86 R |
| 3,783,107 | 1/1974 | Kohlmuller | 136/86 R |

Primary Examiner—John H. Mack
Assistant Examiner—H. A. Feeley
Attorney, Agent, or Firm—Kenyon & Kenyon Reilly Carr & Chapin

[57] ABSTRACT

A fuel cell battery consisting of a plurality of fuel cells which are individually enclosed by plastic frames for reacting gaseous reactants and a liquid electrolyte.

7 Claims, 1 Drawing Figure

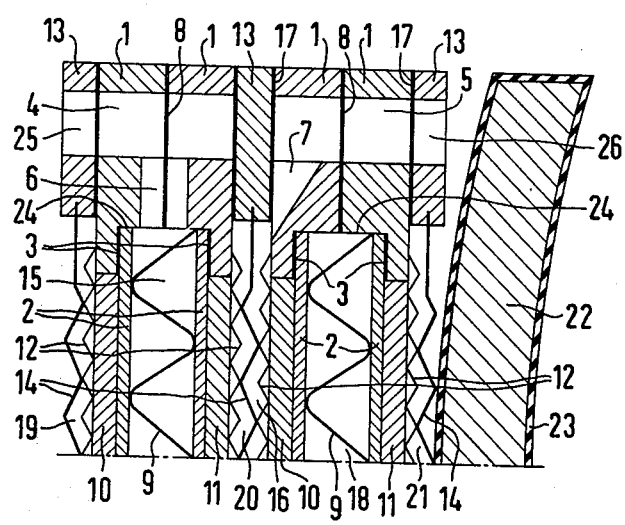

FUEL CELL BATTERY CONSISTING OF A PLURALITY OF FUEL CELLS

This is a continuation of application Ser. No. 261,245 245 filed June 9, 1972, now abandoned.

BACKGROUND OF THE INVENTION

1. Field of the Invention

This invention relates to the field of fuel cell batteries and, more particularly, to a fuel cell battery consisting of a plurality of fuel cells, which are individually enclosed by plastic frames, for reacting gaseous reactants and a liquid electrolyte.

2. Description of the Prior Art

Fuel cells with electrodes arranged on both sides of the support frame are disclosed in French Patent No. 1,419,577. In the French Additional Patent No. 89,422, an addition to French Patent No. 1,419,577, it has been proposed to provide the support frame, at least on one side, with a cover layer which is gas-tight and ionconducting in the electrolyte-saturated condition. The support frame and the electrodes are usually embedded in a frame of plastic material, through which the electrolytic liquid can be fed by means of individual holes to the support frame, and the reactants to the electrodes. O-rings are used in most cases for sealing the cover layers as well as the fuel cells, which are combined to form a fuel cell battery and are clamped together by means of bolts.

It has now been found that in the operation of fuel cells, and particularly of fuel cell batteries with support frames and/or electrodes which are cast into plastic frames, deformations due to thermal and mechanical stresses are to be expected, so that tension cracks can occur and the plastic material can become permeable for the electrolytic liquid or the reactants, respectively. This is the case particularly if the fuel cells or the fuel cell battery, respectively, are operated at elevated temperatures, for instance, above 80°C.

SUMMARY OF THE INVENTION

This invention relates to an improved fuel cell battery consisting of a plurality of fuel cells, which are individually enclosed by plastic frames, for reacting gaseous reactants and a liquid electrolyte. In particular, the difficulties that occur in known fuel cell batteries due to thermal and mechanical compression stresses and which result from leaks, are avoided.

According to this invention, the improvement is achieved by providing the following assembly of structural parts: Asbestos diaphragms are cemented at the rim into recesses of the plastic frames, which have main ducts and supply canals for the reactants and the electrolyte. Two such assemblies, each consisting of a frame and diaphragm, are arranged in mirror-image fashion and are cemented together to form a structural unit. A support frame is arranged between the diaphragms. Catalytic material in powder form (optionally reinforced by a binder) and supported by spacer screens, is arranged on the sides of the asbestos diaphragms facing away from the support frame. A metallic contact plate with an elastomer pressed on to its edge is arranged between each of the structural units, the elastomer layer being provided with openings for the main ducts for the reactants and the electrolytic liquid and being cemented to the plastic frames of the two structural units. End plates are always arranged at the ends of the battery next to the metallic contact plates.

In the fuel cell battery of this invention, difficulties due to leaks no longer occur. Due to the mechanical design of this fuel cell battery, which is assembled from individual subassemblies, the tightness of the gas chambers against each other and against the electrolyte chambers, as well as the sealing of the gas and electrolyte chambers against the outside, is assured.

The coating of the metallic contact plate with an elastomer layer has the advantage that different thermal expansion between the metal and the plastic, as well as the thickness tolerances of the individual parts can be compensated for by this elastic buffer. Through the stacking of the subassemblies by filter press techniques and the cementing together of these subassemblies a completely closed, tight fuel cell battery is produced. The openings in the elastomer layer are arranged to align with corresponding ducts in the plastic frames so that, in the assembly of the fuel cell battery, adjacent and mutually separated main ducts for the reactants and the electrolytic liquid are provided, for supplying as well as discharging them.

In the fuel cell battery of this invention the supply ducts for the reactants are advantageously worked into the plastic frames in the form of inclined recesses. The flow resistance in the gas supply ducts can thereby be limited to a minimum.

Furthermore, the end plates may consist advantageously of metal that is provided with a plastic coating, and may be curved; the end plates being arranged in the fuel cell battery in such a manner that the curvature points toward the interior of the battery. As a result of the predetermined curvature of the end plates, a uniform contact pressure, after the battery is assemblied, is exerted on each individual area element within the battery, which is particularly important for the electrodes. It has been found that when fuel cell batteries are clamped together by means of tension bolts, which is done at the edge of the end plates, a different contact pressure is exerted on the individual area elements and the end plates are deformed by the pressure exerted and are bent outward in the center. By means of the preformed curvature of the end plates, these difficulties can be avoided.

DESCRIPTION OF THE DRAWING

The drawing is a partial cross section of the fuel cell battery taken in different planes.

DETAILED DESCRIPTION

Referring to the drawing, asbestos diaphragms 2 are cemented into the recesses 24 of plastic frames 1. The cemented surfaces between the asbestos diaphragms 2 and the plastic frames 1 are designated with the numeral 3. The asbestos diaphragms 2 are gas tight in the electrolyte-saturated condition and serve to separate the electrolyte chambers 15, 18 from the gas chambers 16, 19, 20 and 21. The asbestos diaphragms 2 also serve as electric insulators. The plastic frames 1 are preferably molded of epoxy resin.

The plastic frames 1 contain two types of main ducts, one type for feeding in and discharging of reactants and one type feeding in and discharging of the electrolytic liquid; and two types of supply canals, one type for feeding in and discharging of the reactants and one type for feeding in and discharging of the electrolytic liquid. A main electrolyte duct is designated with the numeral 4 and an electrolyte supply canal is designated with the numeral 6. A main reactant duct for one of the reaction gases is designated with the numeral 5 and a gas supply canal is designated with the numeral 7. FIG. 1 is not a cross section in one plane. The section shown in FIG. 1 is taken so that a main electrolyte duct 4 and a main duct 5 for a reactant can be seen. The same is true in reference to the electrolyte supply canal 6 and gas supply canal 7.

The electrolyte supply canal 6 connects the main electrolyte duct 4 with the electrolyte chamber 15 of a fuel cell. A gas supply canal 7 connects the main reactant duct 5 for the corresponding reaction gas with a gas chamber 16.

Two structural parts, each consisting of a plastic frame 1 with an asbestos diaphragm 2 cemented to it, are arranged in mirror-image fashion with respect to one another and are cemented together to form a structural unit. The asbestos diaphragms 2 are cemented at the rim into the recesses of the plastic frames 1. The cementing surface between each of the two structural parts is indicated by the numeral 8.

Support frames 9 are arranged between the asbestos diaphragms 2 and support the asbestos diaphragms 2 against gas and contact pressure. The support frames 9 at the same time fill the electrolyte chambers 15 and 18, respectively.

Electrodes 10 and 11 are arranged on the opposite side of the asbestos diaphragms 2 from the support frames 9. Electrodes 10 and 11 are of catalytic material in powdered form and are optionally reinforced by binding agents. Asbestos fibers or plastic binding agents may be used as the binder material. The electrodes 10 and 11 are supported by spacer screens 12.

Thus, each structural unit consists of: two support screens 12, two electrodes 10 and 11, two asbestos diaphragms 2, a support frame 9 and two plastic frames 1. A metallic contact plate 14 is always arranged between each of the structural units with an elastomer layer 13 pressed onto the metallic contact plate 14 at its edge. The elastomer layer 13 is cemented on both sides to the plastic frames 1 of the structural unit. The cemented surfaces between the elastomer layer 13 and the plastic frames are designated with the numeral 17.

The elastomer layers 13 are provided with openings which serve as the main ducts for the electrolytic liquid and for the reactants. Opening 25 is part of the main electrolytic duct and opening 26 forms part of one of the main reactant ducts for one of the gaseous reactants.

The supply canals to the electrolyte chamber 18 and to the gas chambers 19, 20 and 21 are not visible in the cross section through the fuel cell battery shown in FIG. 1.

FIG. 1 also shows a partial cross section of a curved end plate 22. The end plate 22 may consist of a metal, such as steel, and is coated with a plastic coating 23 such as an elastomer. The holes in the end plate are also coated with this plastic coating. The plastic coating 23 of the end plate 22 serves as electric insulation. The curvature of the end plate 22 is directed toward the interior of the battery.

A fuel cell battery is formed by stacking the assemblies. The fuel cell battery comprises contact plates 14 having elastomer layer 13 and respectively the assemblies which consist of the support screens 12, electrodes 10 and 11, diaphragms 2, support frame 9 and plastic frames 1. All the fuel cells are connected in series via contact plates 14 into which hollow spaces for the gas supply are advantageously embossed. The contact plates 14 always separate the gas chambers 19, 20 and 21 from each other, i.e., the hydrogen chamber from the oxygen chamber of each fuel cell.

Before the elastomer layer 13 is passed around it, the contact plate 14 may also be immersed in a resin, such as epoxy resin, as an intermediate adhesive. The resin is allowed to pre-set and is subsequently pressed together with the elastomer layer 13. Nickel sheets with embossed hollow spaces or flow channels for the reactants may be advantageously used as the contact plates 14.

The plastic frames 1 consist preferably of an epoxy resin base molding. The cementing mass used is preferably of an epoxy resin base. The elastomer used is preferably an elastomer having an epichlorhydrin base.

The assembly of the fuel cell battery from individual assemblies can also be applied to fuel cell batteries in which one reactant is dissolved in electrolytic liquid, such as hydrazine-air or hydrazine-oxygen fuel cell batteries.

In the foregoing description the invention has been described in reference to specific exemplary embodiments. It will be evident, however, that variations and modifications in the embodiments explained by way of illustration may be made without departing from the broader scope and spirit of the invention as set forth in the appended claims. The specification and drawing are accordingly to be regarded in an illustrative rather than in a restrictive sense.

What is claimed is:

1. A fuel cell battery, comprising a plurality of fuel cells, for reacting gaseous reactants and a liquid electrolyte, each of said fuel cells comprising:

plastic frames (1) provided with recesses (24) for enclosing each fuel cell;

asbestos diaphragms (2) cemented at the rim thereof into said recesses, each diaphragm and plastic frame forming a structural part, two of said structural parts being arranged in mirror-image fashion and having the plastic frames thereof cemented together to form a structural unit;

canals in each of said plastic frames for feeding in and discharging reactants and electrolytic liquid;

main ducts in each of said plastic frames for feeding in and discharging reactants and electrolytic liquid;

a support frame (9) disposed between said diaphragms of said structural unit and forming an electrolyte chamber (15);

catalytic material in powdered form disposed on the opposite side of each diaphragm from said support frame and forming electrodes (10 and 11) for said fuel cells;

spacer screens (12) disposed adjacent said catalytic material for supporting said catalytic material adjacent said diaphragms;

the fuel cell battery further comprising:

first metallic contact plates (14) disposed between said structural units and contacting said spacer screens, each of said first metallic contact plates having an elastomer layer (13) pressed onto said plate at its edge forming a frame enclosing said edge of each of said first metallic contact plates, said elastomer layer being provided with openings (25, 26) for the main ducts and being cemented to the plastic frames of two of said structural units;

second metallic contact plates (14) disposed at the ends of said fuel cell battery, each of said second metallic contact plates having an elastomer layer (13) pressed onto said plate at its edge forming a frame enclosing said edge of each said second metallic contact plates, and said elastomer layer being provided with openings (25, 26) for the main ducts and being cemented to the plastic frames of two of said structural units; and end plates (22) comprised of metal and having a plastic coating (23) disposed at the ends of the battery, each of said end plates being disposed adjacent one of said second metallic contact plates, said second metallic contact plates each being disposed between a structural unit and one of said end plates.

2. A fuel cell battery according to claim 1, wherein said supply canals for the reactants are in the form of inclined recesses.

3. A fuel cell battery according to claim 1, wherein said end plates are curved and are arranged at the ends of the fuel cell battery so that the curvature of the end plates point toward the interior of the battery for the purpose of exerting a uniform contact pressure after the battery is assembled.

4. A fuel cell battery according to claim 1, wherein said first and second metallic contact plates are each made of a nickel sheet having hollow spaces for the reactants.

5. A fuel cell battery according to claim 1 wherein said first and second contact plates are coated with a resin which serves as an intermediate adhesive between the elastomer layer and said contact plates.

6. A fuel cell battery according to claim 1 wherein the plastic frames consist of an epoxy resin base molding.

7. A fuel cell battery according to claim 1, wherein the elastomer has an epichlorhydrin base.

* * * * *